United States Patent [19]

Wandinger

[11] Patent Number: 5,791,015
[45] Date of Patent: Aug. 11, 1998

[54] EYEGLASS HINGE

[75] Inventor: Jakob Wandinger, Waldkraiburg, Germany

[73] Assignee: Optische Werke G. Rodenstock, Munich, Germany

[21] Appl. No.: 591,552
[22] PCT Filed: Apr. 26, 1995
[86] PCT No.: PCT/EP95/01699
§ 371 Date: Feb. 5, 1996
§ 102(e) Date: Feb. 5, 1996
[87] PCT Pub. No.: WO95/35524
PCT Pub. Date: Dec. 28, 1995

[30] Foreign Application Priority Data

Jun. 17, 1994 [DE] Germany ............... 44 21 309.3

[51] Int. Cl.⁶ ........................................... G02C 5/22
[52] U.S. Cl. .................... 16/228; 16/266; 16/386; 351/153
[58] Field of Search .................. 16/228, 265, 266, 16/267, 386; 351/121, 153

[56] References Cited

U.S. PATENT DOCUMENTS

| 106,315 | 8/1870 | Browne | 16/266 |
|---|---|---|---|
| 230,491 | 7/1880 | Peer | 16/266 |
| 375,721 | 1/1888 | Ballman | 16/266 |
| 780,136 | 1/1905 | Sloan | 16/266 |
| 1,409,663 | 3/1922 | Burns | 16/266 |
| 1,504,212 | 8/1924 | Carlson | 351/153 |
| 3,999,876 | 12/1976 | Manchester | 16/267 |
| 4,644,891 | 2/1987 | Niina | 16/266 |
| 4,916,968 | 4/1990 | Kabaya | 16/267 |

FOREIGN PATENT DOCUMENTS

| 1266 | 1/1916 | United Kingdom | 16/266 |

*Primary Examiner*—Chuck Mah
*Assistant Examiner*—Donald M. Gurley
*Attorney, Agent, or Firm*—Antonelli, Terry, Stout & Kraus, LLP

[57] ABSTRACT

The invention relates to a hinge connection between an eyeglass temple and a frame for eyeglass lenses. The eyeglass temple possesses at its end to be connected to the frame a joint element (1) which can be directly coupled to the frame without any snapping effect with a corresponding mounting element (7). The joint element (1) possesses a prolongation, which is connected to the eyeglass frame, with a pin (4) where the ends (5.6) of the pin (4) protrude beyond the prolongation on opposite sides of it. The mounting element (7) possesses two spaced arms (8,) which each surround one of the ends (5.6) of the pin (4) protruding beyond the prolongation of the joint element (1). At least one of the arms (9) surrounds the pin end (5) only partially while forming an introduction aperture (12). When inserting the pin (4) in the pin mounting apertures by pushing the pin (4) in the direction of its longitudinal axis, the prolongation is guided through the introduction aperture (12). The introduction aperture (12) is outside the swivel range of the prolongation (3) resulting from the swiveling of the eyeglass temple between the temple open position and the temple closed position.

14 Claims, 7 Drawing Sheets

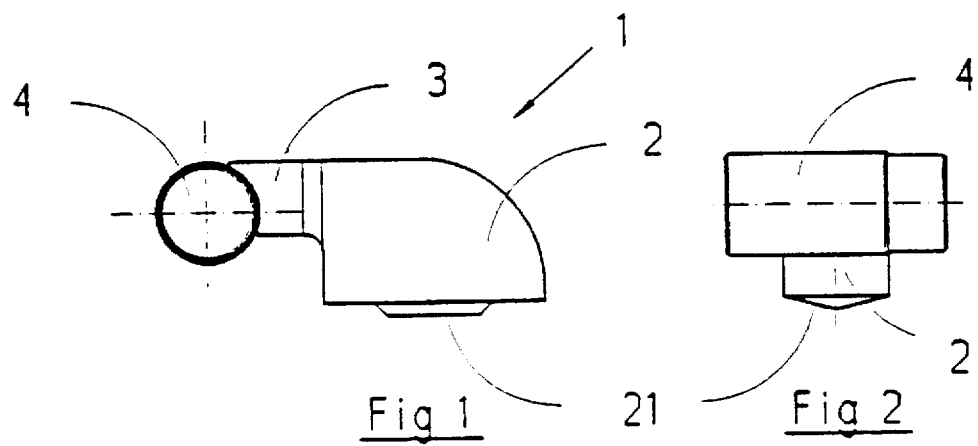
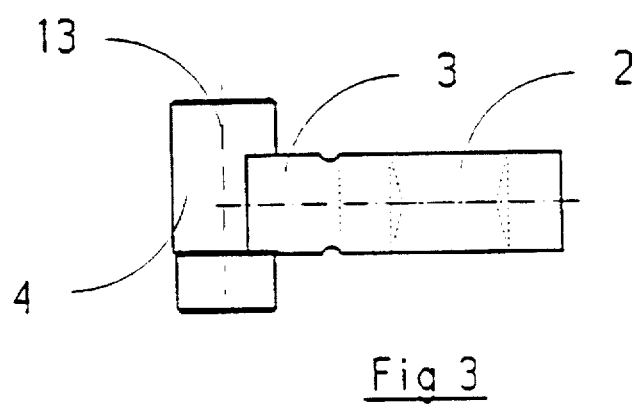
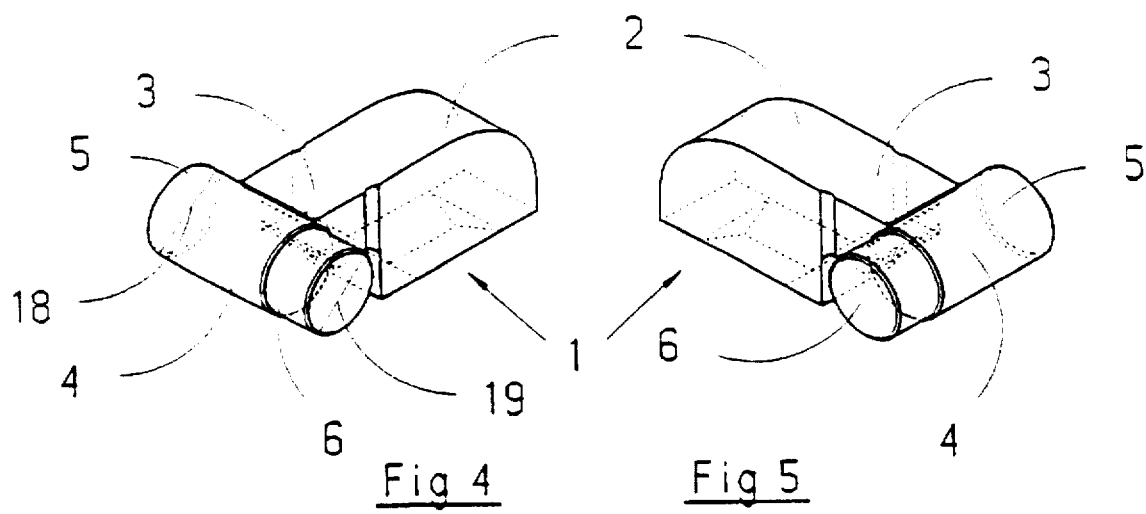

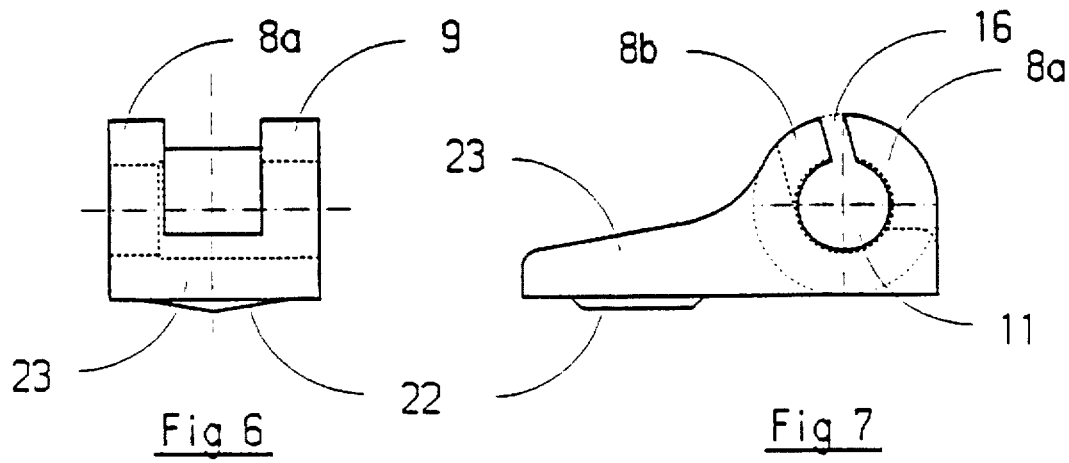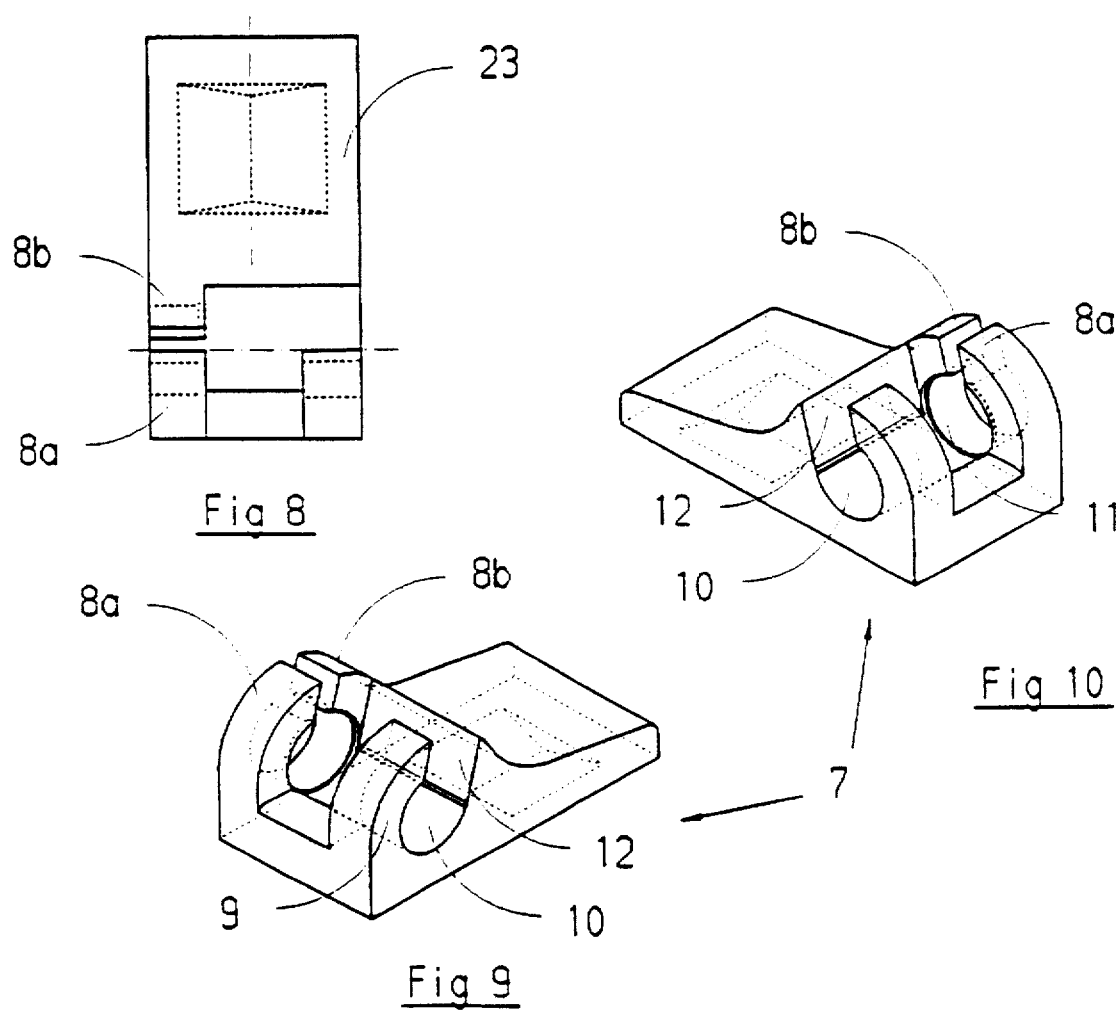

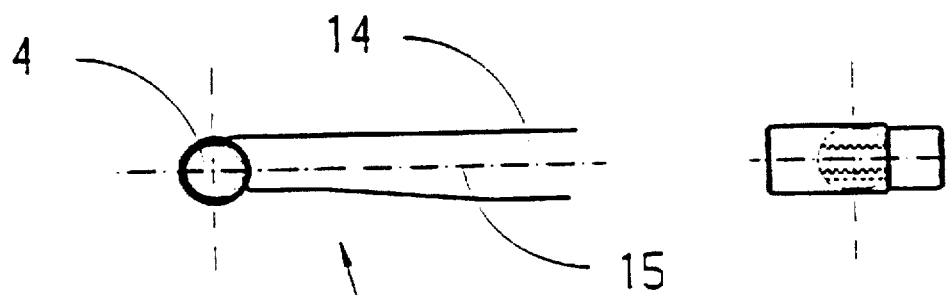
Fig 12
Fig 13
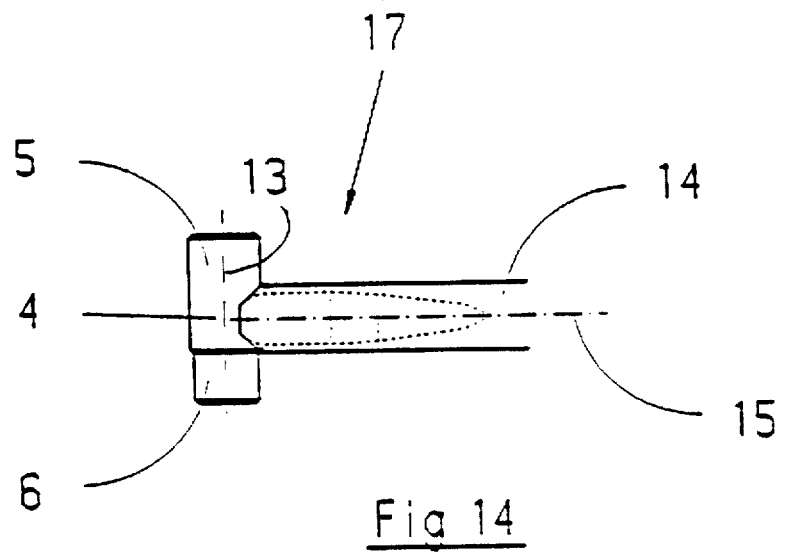
Fig 14
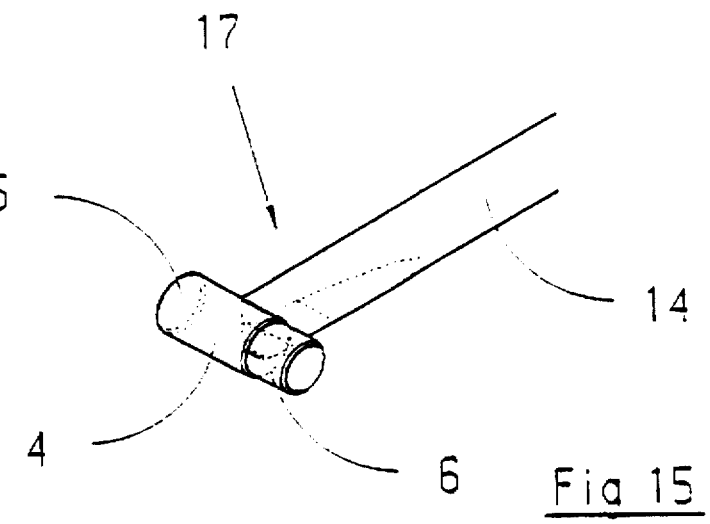
Fig 15

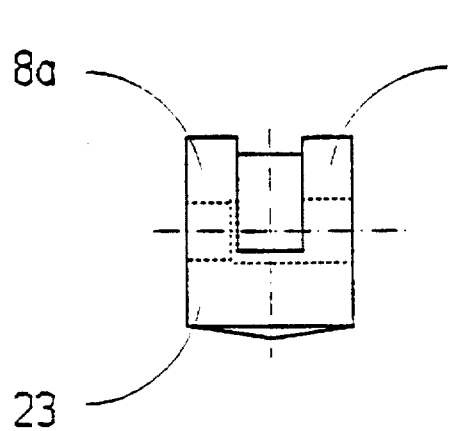
Fig 16
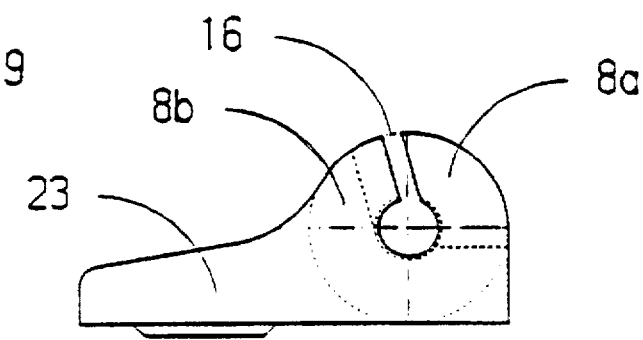
Fig 17
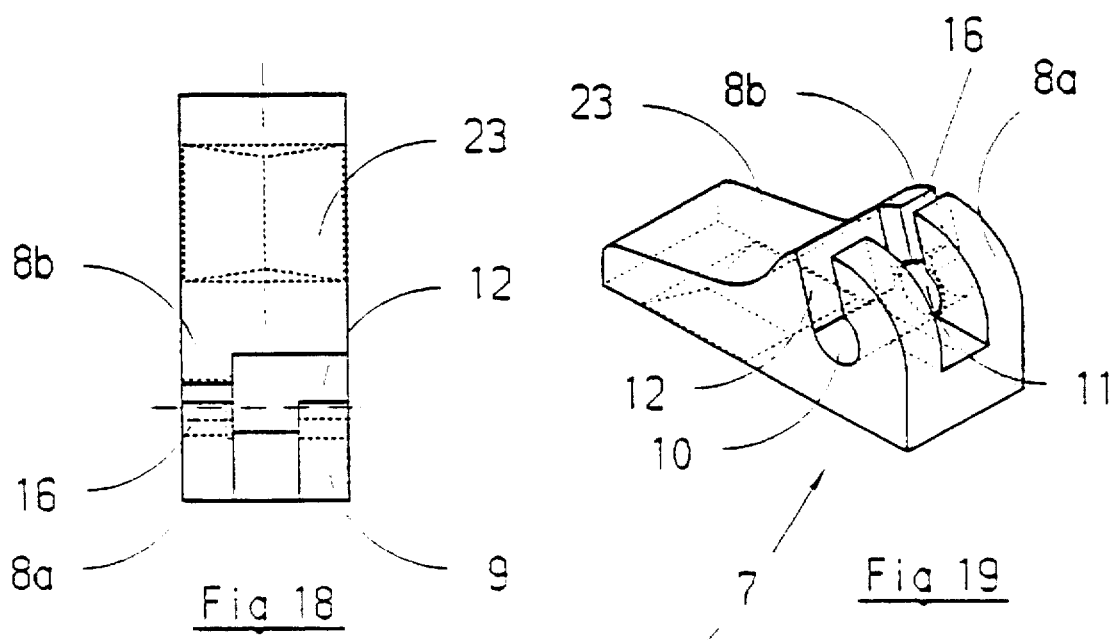
Fig 18
Fig 19
Fig 20

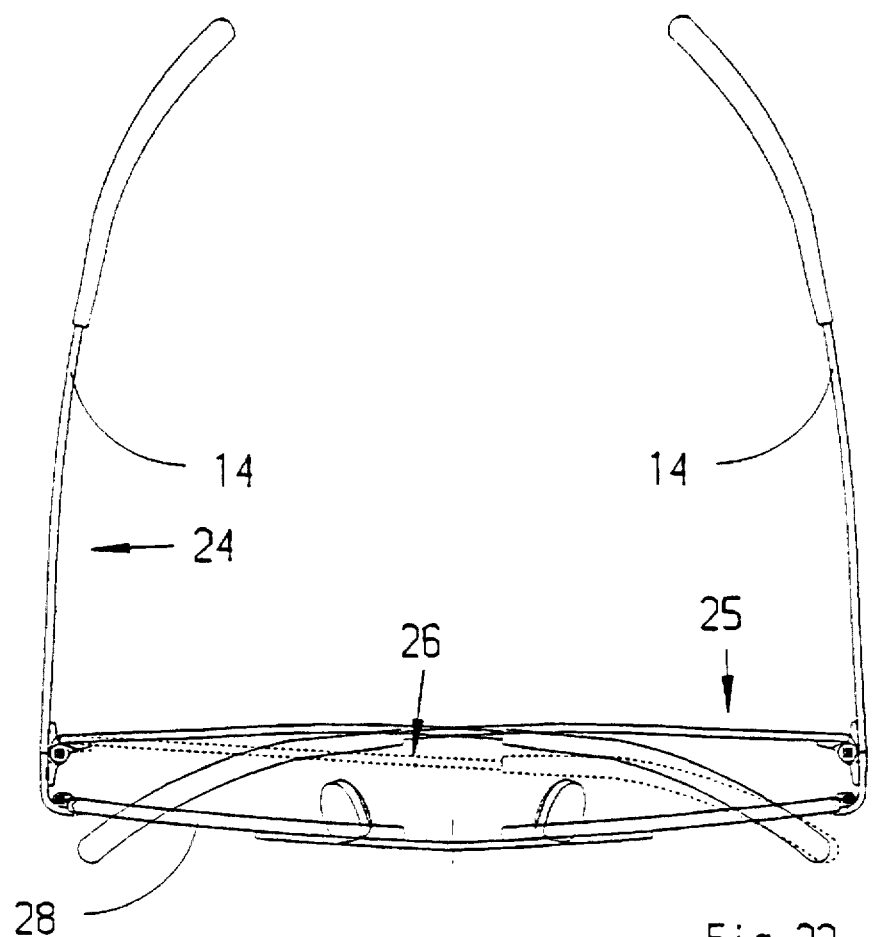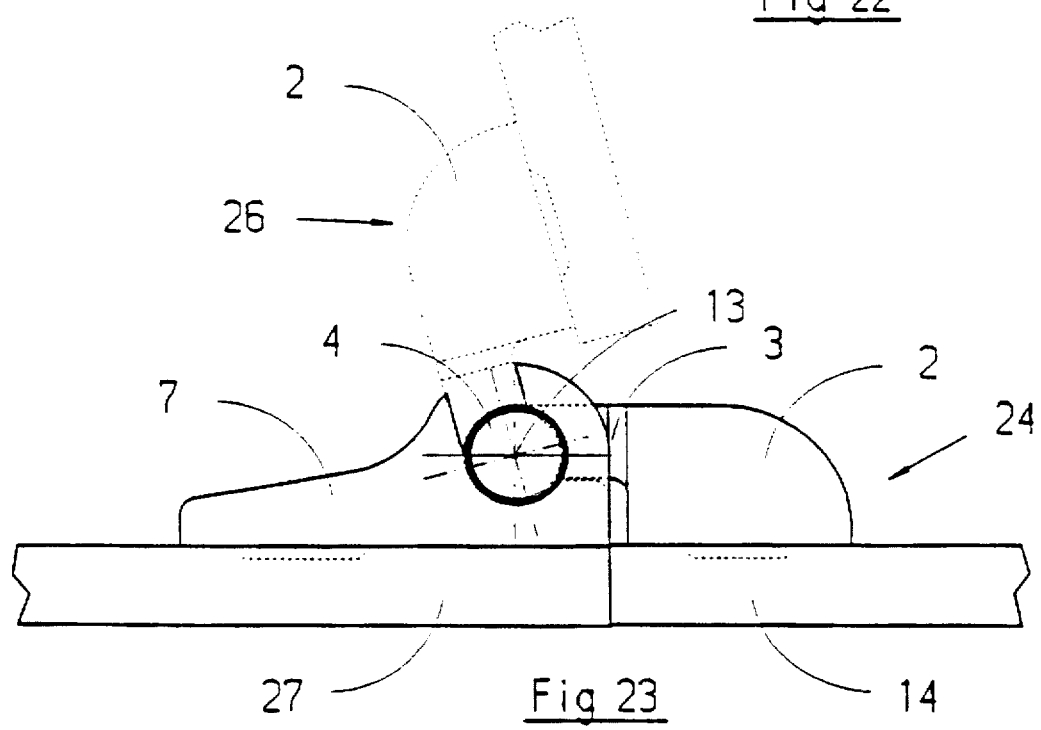

EYEGLASS HINGE

BACKGROUND OF THE INVENTION

The invention relates to a hinge connection between an eyeglass temple and a frame for eyeglass lenses.

Hinge connections of the above type have the advantage that when they are used, hinge screws or other loose connecting parts or additional spring elements of conventional hinges can be dispensed with. With conventional hinges it is difficult to fasten the hinge screw in such a way that, on the one hand, the hinge does not have too stiff a motion and, on the other hand, that the hinge screw does not become loose so that the hinge no longer has any motion regulation.

Hinge connections are more simple which can do without hinge screw or other loose connection parts or additional spring elements.

The U.S. Pat. No. 1,504,212 reveals a hinge connection for an eyeglass frame where a joint element and a mounting element can be coupled directly. To allow coupling a pin, from which a prolongation protrudes laterally for the fixation of an eyeglass temple, can be introduced into the mounting element by pushing in the direction of its longitudinal axis. To allow introduction of the pin together with the prolongation into the mounting element, the mounting element possesses a T-shaped slit. The introduction aperture for the prolongation is positioned within the swivel range of the prolongation results from the swiveling of the eyeglass temple between the temple opening position and the temple closing position. This known hinge connection has the disadvantage that a holding nut is required to secure the connection.

The German A1 34 04 511 reveals a hinge with two meshing hinge parts which are connected to each other in a swiveling fashion. The eyeglass temples possess on each end which is to be connected to the frame a hinge part designed as a joint element which can be directly coupled with a further hinge part on the eyeglass frame where said hinge part is designed as a mounting element.

The screw securing of replaced with this hinge by a snapping, clicking or trapping of one hinge part into the other ("snapping effect"). Here, it is necessary to expand parts of the mounting element. The material must therefore possess very high inherent elasticity in order to allow the required elastic shaping (the clear width of the "attachment channel" is, for example, 20% smaller than the diameter of the pin which is snapped in). However, there are hardly any materials which additionally also possess the stability and connectability with other materials required for an eyeglass hinge.

In order to obtain sufficient stability, the hinge part designed as a mounting element must additionally be so large in size that it is not suitable for narrow lugs and eyeglass temples. Finally, the eyeglass temple can be dismantled not only in the spectacle closing position, but also in the spectacle opening position and in any intermediate position. This is, however, a disadvantage for safety reasons.

The object of FR PS 1126049 is also a hinge connection with a "snapping effect". Here, the introduction aperture for a joint element is positioned in such a way that the part to be introduced does not fit into the introduction aperture in the swivel range produced. The hinge connection is unsuitable for hinges with the smallest possible dimensions and particularly for metal frames with small dimensions. The hinge material must also have the material properties specified in DE-A1 34 04 511.

With the hinge connection revealed by DE-A1 42 14 531 the hinge part of the eyeglass temple can also be directly coupled with a hinge part on the frame. According to one of the embodiments, which is, however, suitable for plastic frames, a pin is fixed to the eyeglass temple which possesses a radially protruding elongation at its free end. The pin is inserted into a borehole on the frame whereby for assembly the elongation is guided by a groove on the internal circumference of the borehole.

With this hinge the connection between pin and eyeglass temple is subject to high strain. This means either a less stable joint connection or that not only the frame has to be designed in a reinforced manner in the vicinity of the side edges, but also the pin. The use of the known hinge is therefore restricted to plastic frames with a relatively large hinge and so wide temples. The hinge part of the frame (front hinge) is transposed against the temple with the known frame. As a result the known hinge is not suitable, for example, for temple/lug combinations. Finally, the friction resistance required for a motion regulation is not ensured with the known hinge connection. The proposed humps or ribs on the cone lead to high wear of ribs and grooves and so to a rapid deterioration of the desired motion regulation.

SUMMARY OF THE INVENTION

The object of the invention is to give a hinge of the type described above which can be used not only for special hinge types, but with practically all eyeglass hinge types. The hinge should in addition possess the smallest possible dimensions while nevertheless allowing a stable and easy to assemble connection of the hinge parts.

This object is solved according to the invention by the providing a hinge having an introduction aperture outside the swivel range of a prolongation resulting from the swiveling of the eyeglass temple between the temple open position and the temple closed position.

With the proposed hinge, a snapping in of the joint element into the mounting element is avoided. The proposed hinge has the advantage over the hinges which have to be assembled with "snapping effect" that the mounting element does not need to possess any extreme elasticity properties. The assembly or dismantling is performed by moving the temple into a position relative to the mounting element in which the joint element can be pushed into the mounting element by moving over the pin mounting apertures and the introduction aperture in the direction of the longitudinal axis of the pin. During the introduction the prolongation is moved through the introduction aperture. The prolongation accordingly has a shape which allows it to be guided through the introduction aperture and which allows it to be swiveled within the two arms after said introduction. Here the prolongation has dimensions such that it can be moved essentially without friction with the arms of the mounting element while nevertheless still forming an axial motion security for the pin.

The proposed hinge thus comprises only one joint element and one mounting element which can be coupled directly, that is without any further connecting parts such as hinge screws. Naturally, the assembly or dismantling can be performed in a simple manner, that is using at best simple aids.

With the proposed hinge pin ends protrude from the prolongation on both sides. The longitudinal axis of the pin is simultaneously the swivel axis of the eyeglass temple. As the two pin ends are each surrounded by one arm of the mounting element, the connection between frame and eyeglass temple is stable. Also due to this reason, among others, the dimensions of the proposed hinge can be kept very small. The hinge is thus also exceptionally suitable for metal frames whose temples possess very small cross-section areas. As the prolongation and thus the temple is fixed in the pin center, eyeglass temples and the frame hinge part are not positioned in transposition to each other, but are located at the same height.

The proposed hinge connection can be utilized with practically all frame or hinge types when suitably redesigned. Among others also with spring loaded joints. Of especial significance is also the possibility of being able to obtain in a simple manner a motion regulation which possesses an essentially constant brake torque over a long period. With the proposed hinge the pin mounting apertures are adapted to the pin ends, that is they are matched to each other as regards their diameters. As one of the arms only partially surrounds the pin end while forming an introduction aperture for the prolongation, it is possible in a simple manner that through this arm initial stress is exerted on the corresponding pin end in a radial direction.

Normally, with an eyeglass frame a limitation of the eyeglass temple swivel range is provided by the frame (the eyeglass front) or by the hinges (hinge impact areas). If, now, the introduction aperture is located outside the swivel range for the prolongation given in claim 1, then any unintentional loosening of the eyeglass temple from the frame of the eyeglass lenses, that is from the front of the eyeglasses, is not possible. The introduction aperture can be provided at a position which the prolongation assumes when the eyeglass temple contacts the frame and is slightly bent, that is when it is moved toward the frame beyond the temple closing position.

In principle, it is possible that the second arm completely surrounds the corresponding pin end.

In a preferred embodiment, however, the second arm can also surround the corresponding pin arm only partially while forming a gap.

In a further variation of the invention it is advantageous (claim 3) when at least one of the arms contacts the corresponding pin end under initial tension and thus exerts friction torque (motion regulation). In particular, it is possible that both arms contact the correspond pin ends under initial tension.

In a further simply produced variation of the hinge in accordance with the invention, the pin is connected to the prolongation and this to a base part. The base part can, for example, be connected to the temple by soldering or welding. Preferably, the prolongation and the base part are produced from one piece.

In a further embodiment of the invention it has proven to be of advantage if the prolongation is integrated in such a way in the end of the eyeglass temple to be connected to the frame that the eyeglass temple possesses at its end to be connected to the frame merely one pin whose longitudinal axis is essentially perpendicular to the longitudinal axis of the temple. In this version, a particularly delicate temple can be used. The prolongation can, for example, be continued without any great change in its cross-sectional shape in the temple with roughly the same cross-sectional shape. Temple and pin can, however, for example, also have different diameters or cross-sectional areas. In these cases, the pin is fixed more or less directly to the temple end with the two longitudinal axes being essentially perpendicular to each other.

To simplify the assembly and the dismantling, it has proven to be favorable if the pin ends have different diameters. During assembly the pin end with the smaller diameter can be led more easily through the pin mounting aperture provided for the pin end with the larger diameter.

Naturally, a version where the joint element possessing the pin is not positioned at the temple, but at the eyeglass front (frame) or the lug and where the taking element is positioned at the temple also forms part of the claimed hinge connection.

BRIEF DESCRIPTION OF THE DRAWINGS

Embodiments of a hinge connection are explained below with reference to schematic sketches.

The figures show:

FIGS. 1 to 5: A first embodiment of a joint element in a top view, side view and front view.

FIGS. 6 to 10: An embodiment of a mounting element for a joint element shown in FIGS. 1 to 5.

FIGS. 12 to 15: A second embodiment of a joint element in front view, side view and top view.

FIGS. 16 to 20: An embodiment of a mounting element for a joint element shown in FIGS. 12 to 15.

FIG. 22: A schematic sketch of eyeglasses where different positions of the eyeglass temple are presented.

FIG. 23: A schematically simplified representation of a hinge connection where the joint element is presented in the assembled and dismantled state and in the temple open position.

DETAILED DESCRIPTION OF THE PREFERRED EMBODIMENTS

Figure 11:
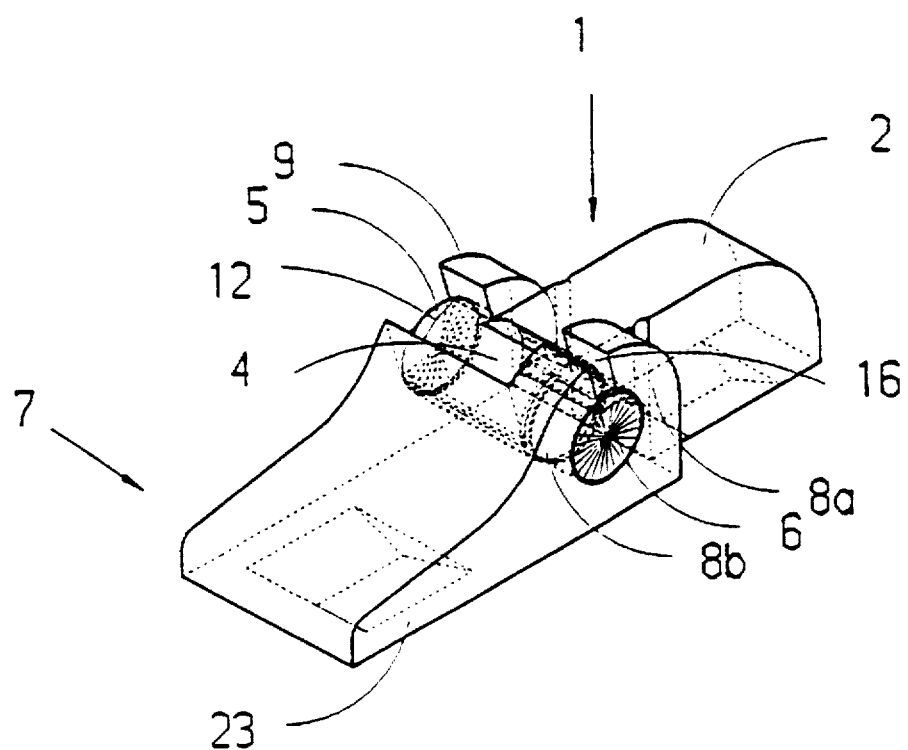
FIG. 11: A representation in which the joint element is assembled in the mounting element.
Figure 21:
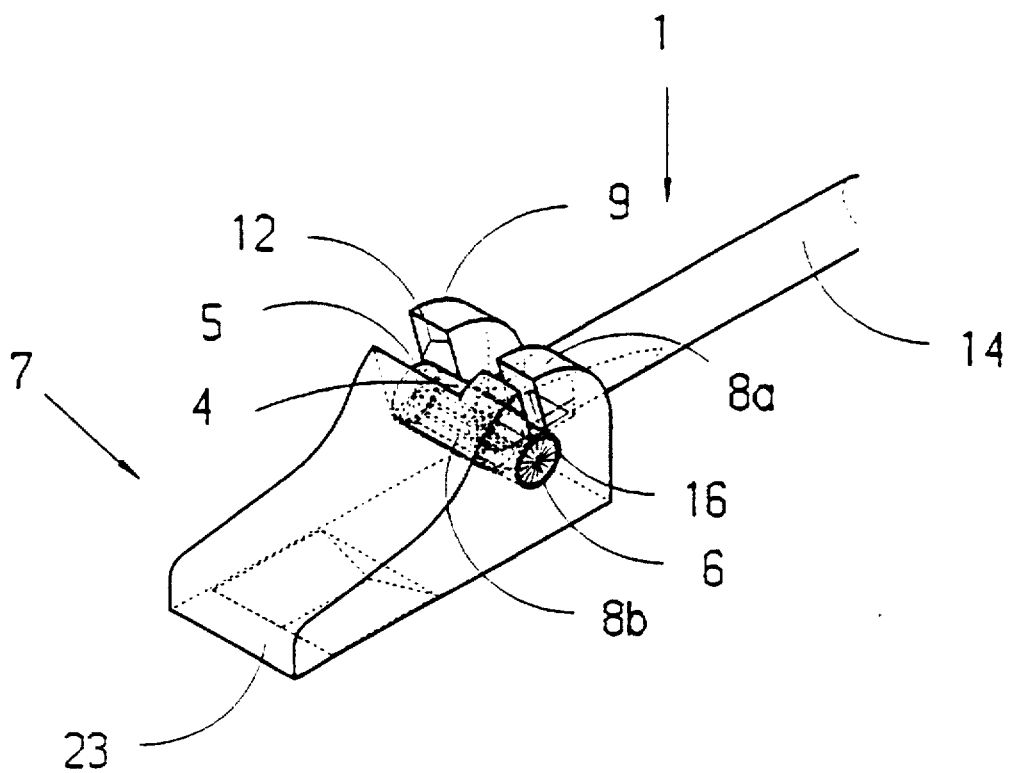
FIG. 21: A representation in which the joint element in accordance with FIGS. 12 to 15 is assembled in a mounting element in accordance with FIGS. 16 to 20.

In the figures parts with the same function have been given the same reference number.

FIG. 1 shows a front view, FIG. 2 a side view, FIG. 3 a top view and FIGS. 4 and 5 an oblique view of a left and right hinge element 1 respectively. On a base part 2 a prolongation 3 is formed on whose end opposite the base part 2 a pin 4 is fixed. The base part 2 can, for example, by welding at a temple not shown here be welded at its end to be connected to the frame. For the welding, weld projections 21 can, for example, be used. The two ends 5, 6 of the pin protrude over the prolongation 3 on opposite sides of it. Reference number 13 refers to the longitudinal axis of the pin. Reference numbers 18 and 19 refer to the diameters of the pin ends 5, 6 which may be different to simplify assembly and dismantling. The eyeglass temple not shown in FIGS. 1 to 5 is thus designed as a joint element at its end to be connected to the frame. The corresponding mounting element 7 on the frame, with which the joint element 1 can be directly coupled without any snapping, is shown in FIGS. 6 to 10. FIG. 6 shows a front view, FIG. 7 a side view, FIG. 8 a top view and FIGS. 9 and 10 an oblique view of a left and a right mounting element. On a base part 23 arms 8a, 8b and 9 are formed. The arms 8a, 8b on the one hand and arm 9, on the other, are positioned at distances to each other in roughly parallel planes. Arm 9 surrounds a pin mounting aperture 10. The arms 8a and 8b surround a pin mounting aperture 11. The mounting element 7 can, for example, be fixed to the frame by welding. Weld projections 22 are used for this purpose.

In FIG. 11 joint element 1 and mounting element 7 are shown in their functional position. It can be seen that the end 5 of the pin 4 which protrudes over the prolongation 3 of the joint element 1 is surrounded by arm 9 while the end 6 of the pin 4 is surrounded by the arms 8a, 8b. Arm 9 surrounds pin end 5 only partially while forming an introduction aperture 12. The second arm 8a, 8b surrounds the corresponding pin end 6 also only partially while forming a gap 16. Due to the gap 16 and the introduction aperture 12 it is possible that the arms 8a, 8b, 9 contact the relevant pin end 5,6 under initial tension. In this way, motion regulation is ensured.

FIG. 22 shows different positions of the eyeglass temple schematically.

The temple open position is referred to with reference number 24, the temple closed position with reference number 25 and the assembly or dismantling position of the temple with reference number 26. The assembly or dismantling of the eyeglass temple is achieved by a slight bending of the eyeglass temple in the direction of the frame 28 and by a pushing movement. This movement is intended to be described using FIG. 23 in which a schematically simplified representation of the joint element in accordance with FIGS. 1 to 5 and the mounting element in accordance with Figures to 10 is presented. The joint element 1 is represented in the temple open position 24 and in the position of assembly and dismantling 26. By the light bending of the eyeglass temple 14 the joint element 1 is pushed in the direction of the longitudinal axis 13 of the pin 4; thus the pin first moves through the pin mounting aperture 10 with the pin end with the smaller diameter, whereas then the prolongation 3 is moved through the introduction aperture 12. The prolongation 3 possesses a shape which allows, on the one hand, it to be guided through the introduction aperture 12 and, on the other hand, allows it to be able to be swiveled within the arms 8, 9 after the introduction of the joint element into the mounting element. The prolongation thus forms an axial motion security for the pin 4.

The introduction aperture 12 is located outside the swivel range of the prolongation 3 resulting from the swiveling of the eyeglass temple between the temple open position 24 and the temple closed position 25. Reference number 27 refers to a lug. As already explained, it is just as possible to fix the joint element 1 to the lug 27 and the mounting element 7 to the eyeglass temple 14.

FIGS. 12 to 15 show a further embodiment of a joint element in a top view (FIG. 14), side view (FIG. 13) and front view (FIG. 12). With this embodiment, the prolongation 3 is integrated in the end 17 of the eyeglass temple 14 to be connected to the frame. The eyeglass temple 14 possesses at its end to be connected to the frame only one pin 4 whose longitudinal axis 13 is essentially perpendicular to the longitudinal axis 15 of the temple.

FIG. 16 to 20 show an embodiment of a mounting element for a joint element presented in the FIGS. 12 to 15.

In the embodiment examples, only one mounting element shape is presented. Naturally, other shapes of the mounting element are also covered by the claimed hinge connection. It is, for example, possible that the mounting element possesses an essentially cylindrical external shape with the mounting element being able, for example, to be connected to the eyeglass front (frame) by a wire-shaped connecting part.

I claim:

1. A hinge connection for connecting an eyeglass temple to a frame for eyeglass lenses without any snapping effect, comprising a joint element having a prolongation with a pin, said pin having two ends, said prolongation having a portion adapted to be connected to the eyeglass temple, where the ends of said pin protrude beyond the prolongation on opposite sides of it, and a mounting element having two arms at a distance to each other and surrounding in each case one of the ends of the pin protruding beyond the prolongation of the joint element where pin mounting apertures surrounded in each case by the arms are shaped to receive the pin ends, and at least one of the arms surrounds one of the pin ends only partially while forming an introduction aperture and where the prolongation can be guided through the introduction aperture during the insertion of the pin in the pin mounting apertures by pushing the pin in the direction of its longitudinal axis, characterized in that the introduction aperture is outside the swivel range of the prolongation resulting from the swiveling of the prolongation between a temple open position and a temple closed position.

2. A hinge connection in accordance with claim 1, characterized in that a each of the arms surrounds the corresponding pin end only partially while forming a gap.

3. A hinge connection in accordance with either of claims 1 or 2, characterized in that a motion regulation is effected by having at least one of the arms contacting the relevant pin end with tension.

4. A hinge connection in accordance with claim 1, characterized in that the pin is connected to the prolongation and the prolongation is connected to a base part.

5. A hinge connection in accordance with claim 4, characterized in that prolongation and base part are made from one piece.

6. A hinge connection in accordance with claim 1, characterized in that the prolongation is integrated in such a way in a end of the eyeglass temple to be connected to the frame that the eyeglass temple possesses at its end to be connected to the frame merely one pin whose longitudinal axis is essentially perpendicular to a longitudinal axis of the temple.

7. A hinge connection in accordance with claim 1, characterized in that the pin ends have different diameters.

8. A hinge connection in connection with claim 1, characterized in that the mounting element consists of a material with goods spring properties and high wear resistance.

9. A hinge connection in accordance with claim 8, characterized in that the mounting element consists of copper-beryllium alloy or a copper-titanium alloy.

10. A hinge connection in accordance with claim 1, characterized in that the prolongation (3) and/or the pin (4) consist of a material with high wear resistance.

11. A hinge connection in accordance with claim 10, characterized in that the prolongation and/or pin consist of stainless steel.

12. An eyeglass frame comprising a frame for holding lenses, a pair of eyeglass temples, and a pair of hinge connections, each hinge connection connecting one of the pair of eyeglass temples to the frame without any snapping effect, each of the hinge connections comprising a joint element having a prolongation with a pin, said pin having two ends, said prolongation having a portion connected to one of the pair of eyeglass temples, where the ends of said pin protrude beyond the prolongation on opposite sides of it, and a mounting element connected to the frame and having two arms at a distance to each other and surrounding in each case one of the ends of the pin protruding beyond the prolongation of the joint element where pin mounting apertures surrounded in each case by the arms are shaped to receive the pin ends, and at least one of the arms surrounds one of the pin ends only partially while forming an introduction aperture and where the prolongation can be guided through the introduction aperture during the insertion of the pin in the pin mounting apertures by pushing the pin in the direction of its longitudinal axis, characterized in that the introduction aperture is outside the swivel range of the prolongation resulting from the swiveling of the prolongation between a temple open position and a temple closed position.

13. An eyeglass frame in accordance with claim 12, wherein each eyeglass temple must be bent in order for the prolongation to be outside the swivel range and guided through the introduction aperture.

14. A hinge connection for connecting an eyeglass temple to a frame for eyeglass lenses without any snapping effect, consisting essentially of a joint element having a prolongation with a pin, said pin having two ends, said prolongation having a portion adapted to be connected to the eyeglass temple, where the ends of said pin protrude beyond the prolongation on opposite sides of it, and a mounting element having two arms at a distance to each other and surrounding in each case one of the ends of the pin protruding beyond the prolongation of the joint element where pin mounting apertures surrounded in each case by the arms are shaped to receive the pin ends, and at least one of the arms surrounds one of the pin ends only partially while forming an introduction aperture and where the prolongation can be guided through the introduction aperture during the insertion of the pin in the pin mounting apertures by pushing the pin in the direction of its longitudinal axis, characterized in that the introduction aperture is outside the swivel range of the prolongation resulting from the swiveling of the prolongation between a temple open position and a temple closed position.

* * * * *